(12) United States Patent
El-Ibiary et al.

(10) Patent No.: US 6,338,281 B1
(45) Date of Patent: *Jan. 15, 2002

(54) BEARING APPARATUS HAVING INTEGRATED LOAD SENSING ARRANGEMENT

(75) Inventors: Yehia El-Ibiary; Richard M. Whiddon; Gary E. DeWachter; John F. Cook, all of Simpsonville, SC (US)

(73) Assignee: Reliance Electric Technologies, LLC, Mayfield Heights, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/910,625

(22) Filed: Aug. 13, 1997

(51) Int. Cl.[7] .................................................. G01L 1/00
(52) U.S. Cl. .................................................. 73/862.381
(58) Field of Search ...................... 73/862.381, 862.338, 73/862.35, 862.474, 862.48

(56) References Cited

U.S. PATENT DOCUMENTS

| 4,411,143 A | * 10/1983 | Scholl et al. ................ 68/12 R |
| 4,757,721 A | * 7/1988 | Horner et al. ............ 73/862.35 |
| 5,020,381 A | * 6/1991 | Bartlett .................... 73/862.48 |
| 5,159,841 A | * 11/1992 | Montalvo, II et al. .. 73/862.474 |
| 5,182,946 A | * 2/1993 | Boughner et al. ............ 73/151 |
| 5,408,887 A | * 4/1995 | Roth et al. ............. 73/862.338 |
| 5,433,525 A | 7/1995 | El-Ibiary |
| 5,439,296 A | * 8/1995 | El-Ibiary .................... 384/448 |
| 5,509,310 A | 4/1996 | El-Ibiary |
| 5,831,222 A | * 11/1998 | Fanger et al. ................ 177/147 |

FOREIGN PATENT DOCUMENTS

WO  WO 97/17599  5/1997

* cited by examiner

Primary Examiner—Benjamin R. Fuller
Assistant Examiner—Jewel V. Thompson
(74) Attorney, Agent, or Firm—Craig N. Killen; Alexander M. Gerasimow; William R. Walbrun

(57) ABSTRACT

A bearing apparatus having one or more integrated load sensors for determining the load imposed on a rotatable shaft. The bearing apparatus includes a bearing housing having a bearing set, such as a bearing insert, located therein. The load sensors are preferably configured as strain gauges having resistance characteristics that vary as the bearing housing is deformed. For example, the strain gauges may be angularly spaced in an arcuate recess defined below the bearing set in the bearing housing. Preferably, circuitry is also provided to condition the deformation signal to provide an indication of loading on the shaft. The conditioning circuitry may be advantageously attached to the exterior of the bearing housing.

4 Claims, 5 Drawing Sheets

BEARING APPARATUS HAVING INTEGRATED LOAD SENSING ARRANGEMENT

BACKGROUND OF THE INVENTION

The present invention relates generally to the art of bearings for facilitating shaft rotation. More particularly, the invention relates to a bearing apparatus having an integrated load sensing arrangement.

In many applications, the load present on a rotating shaft can vary during use. For example, shafts utilized in industrial stirring operations will often accrue material as the shaft turns. At some point, the load on the shaft can exceed a desirable threshold, leading to shaft breakage or other maintenance considerations.

Devices have been developed in the past to monitor shaft load. These devices have generally included specialized load cells placed under the housing of a bearing apparatus utilized to rotatably support the shaft. Alternative designs have also been employed to simplify the arrangement, but these alternative designs have often been bulky, cumbersome and costly.

SUMMARY OF THE INVENTION

The present invention recognizes and addresses the foregoing disadvantages, and others, of prior art constructions and methods. Accordingly, it is an object of the present invention to provide a novel bearing apparatus.

It is a further object of the present invention to provide a bearing apparatus having an improved load sensing arrangement.

It is a particular object of the present invention to provide a bearing apparatus having a load sensing arrangement incorporated into the bearing housing.

It is a particular object of the present invention to provide a bearing apparatus including one or more load sensors operative to determine shaft load based on housing deformation.

It is also an object of the present invention to provide improved methodology for determining shaft load.

Some of these objects are achieved by a bearing apparatus for supporting a rotatable shaft. The bearing apparatus comprises a bearing housing having a bearing set disposed therein. The bearing set includes first and second opposed elements capable of relative rotation. One of the first and second opposed elements is fixed with respect to the shaft for rotation therewith.

The bearing apparatus further includes at least one load sensor located within the bearing housing for providing an electrical indication of loading on the rotatable shaft. Preferably, each such load sensor is fixed with respect to the bearing housing. For example, each load sensor may comprise a strain gauge, such as a rosette strain gauge, having electrical characteristics that vary as the bearing housing is deformed.

In some exemplary embodiments, a pair of load sensors may be utilized, radially separated from the shaft. In this case, the pair of load sensors are also preferably spaced apart from each other by a predetermined angular separation.

Typically, the bearing set may comprise a bearing insert in which the first and second opposed elements comprise respective inner and outer rings thereof. A plurality of bearing elements are disposed in the region between the inner and outer rings. In such embodiments, the bearing housing may define a recess, radially external of the outer ring, in which the load sensors are located. For example, a pair of angularly separated load sensors may be located in the recess.

The bearing apparatus may further comprise power and detection circuitry in electrical communication with the load sensor. Often, the detection circuitry will be configured to provide a voltage signal indicative of loading on the shaft. Current output circuitry may be utilized to provide a current output signal based on the voltage signal. It will often be desirable to mount the various circuitry to an exterior of the bearing housing.

Other objects of the present invention are achieved by a bearing apparatus for supporting a rotatable shaft having a bearing housing and a bearing set disposed therein. A plurality of load sensors are also located within the bearing housing for providing an electrical indication of loading on the rotatable shaft. Preferably, the load sensors are radially separated from the shaft and are spaced apart from each other by a predetermined angular separation. The bearing housing may define an arcuate recess radially spaced from the shaft, in which the load sensors are fixed.

Still further objects of the present invention are accomplished by a bearing housing comprising a housing structure defining a shaft opening about a central axis. The housing structure also defines an interior cavity configured to receive a bearing insert. In addition, a recess having at least one strain gauge fixedly located therein is defined at a predetermined location on a surface of the housing structure, such as an interior surface thereof. The strain gauge exhibits electrical characteristics that vary as the housing structure is deformed.

In some exemplary embodiments, the recess is configured as an arcuate recess radially spaced from the central axis. For example, where the housing structure comprises top and bottom matable portions, the arcuate recess may be defined in the bottom matable portion. In such embodiments, a plurality of strain gauges may be located in the recess, separated from each other by a predetermined angular separation.

The housing may also include power and detection circuitry mounted to an exterior thereof. Electrical communication between the external circuitry and the strain gauges may be provided by electrical wires extending through a bore defined in the housing structure.

Additional objects of the present invention are achieved by a method for detecting loading on a rotating machine element. One step of the method involves supporting the machine element in rotation utilizing a bearing apparatus including a housing and at least one bearing set disposed therein. As a further step, deformation of the housing due to loading on the machine element is detected. Preferably, housing deformation may be detected utilizing a strain gauge fixed to the bearing housing. A deformation signal representative of housing deformation is then generated.

According to exemplary methodology, the deformation signal may be further conditioned to provide an indication of loading on the rotating machine element. For example, where the deformation signal is a voltage signal, a current output signal may be produced based on the voltage signal.

Other objects and aspects of the present invention are provided by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIG. 8 is a schematic diagram of conditioning circuitry that can be utilized in a bearing apparatus of the present invention.

Figure 1:
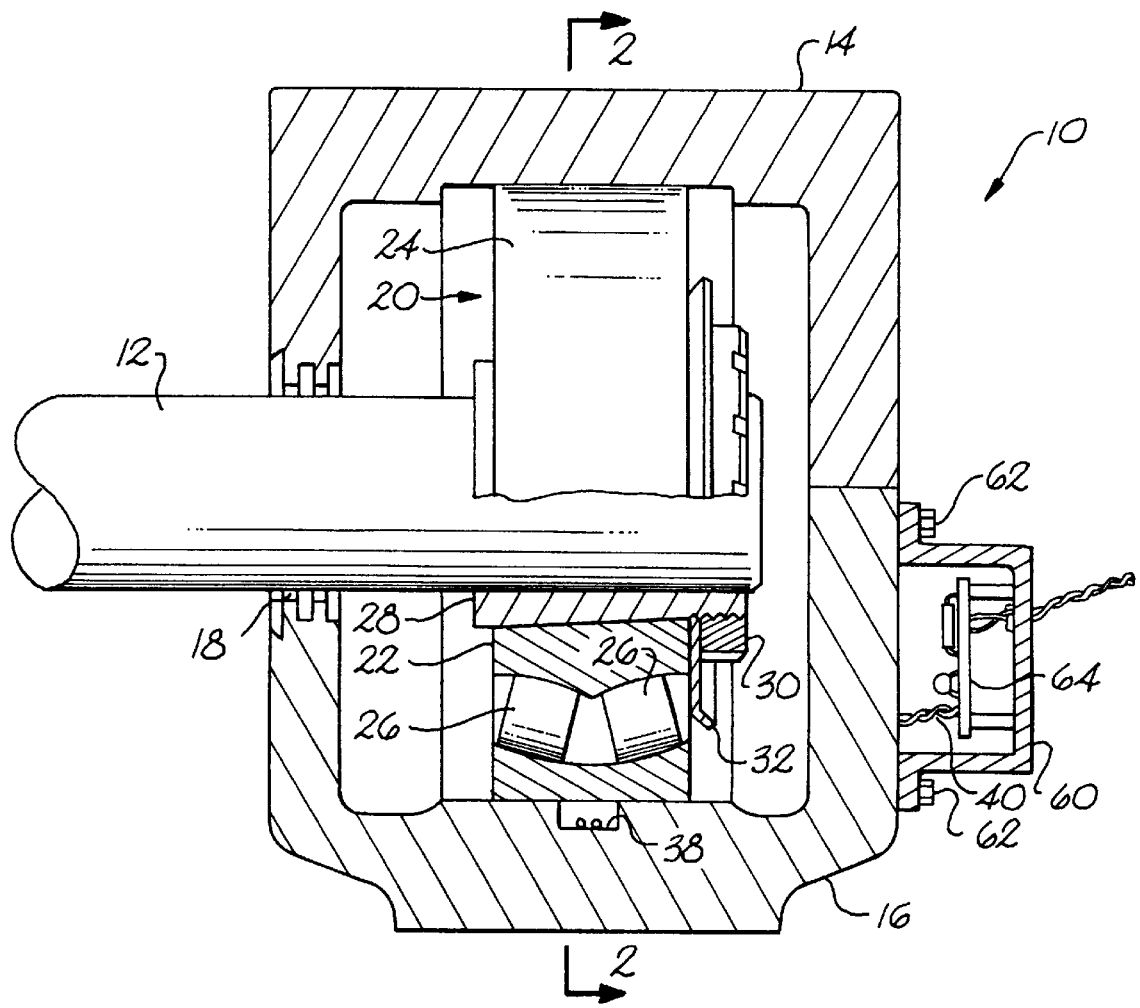
FIG. 1 is a cross sectional view of a bearing apparatus constructed in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates a bearing apparatus 10 of the present invention supporting a rotatable shaft 12. Apparatus 10 includes a bearing housing having a top portion, or cap 14, situated on a base portion 16. Cap 14 and base portion 16 mate to define on one side a shaft opening 18 about a predetermined central axis. The other side of the bearing housing may be closed in this case because shaft 12 terminates at a location internal thereto.

A bearing set, here in the form of a bearing insert 20, is located inside of the bearing housing. Bearing insert 20 includes a bearing inner ring 22 defining an inner raceway about its outer circumferential surface. An opposed outer raceway is likewise defined on the inner circumferential surface of bearing outer ring 24. A plurality of bearing elements, such as roller bearings 26, are disposed between the inner raceway and the outer raceway to facilitate relative rotation between rings 22 and 24. While roller bearings are illustrated, it should be appreciated that other suitable types of bearing elements, such as ball bearings, may also be utilized for this purpose.

Depending on the exigencies of a particular application, various techniques may be utilized to effect securement of inner ring 22 to shaft 12. In this case, inner ring 22 is secured to shaft 12 utilizing a known tapered adapter arrangement. Toward this end, shaft 12 extends through an adapter 28 having a tapered outer surface. Inner ring 22 defines a tapered inner surface situated in opposition to the tapered outer surface of adapter 28.

Typically, adapter 28 will define a radial opening, or slot, extending along its entire axial length. This radial opening allows adapter 28 to contract about shaft 12 when its tapered outer surface and the tapered inner surface of inner ring 22 are moved axially together. In the illustrated embodiment, adapter 14 is "pulled" through inner ring 22 by rotation of nut 30. As shown, it will often be desirable to provide a washer 32 between nut 30 and the adjacent end face of inner ring 22. As nut 30 is rotated, inner ring 22 will be positively secured to shaft 12 for rotation therewith.

Bearing apparatus 10 further includes at least one load sensor for detecting a load imposed on shaft 12. In presently preferred embodiments, each load sensor comprises a strain gauge fixed to the bearing housing for detecting housing deformation. The deformation detected in this manner is indicative of the shaft load.

Figure 4:
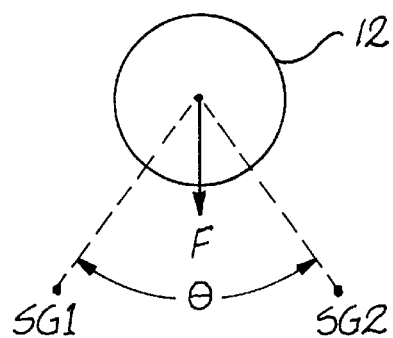
FIG. 4 is a diagrammatic illustration showing the positions of angularly spaced load sensors in relation to shaft load force.
Figure 3:
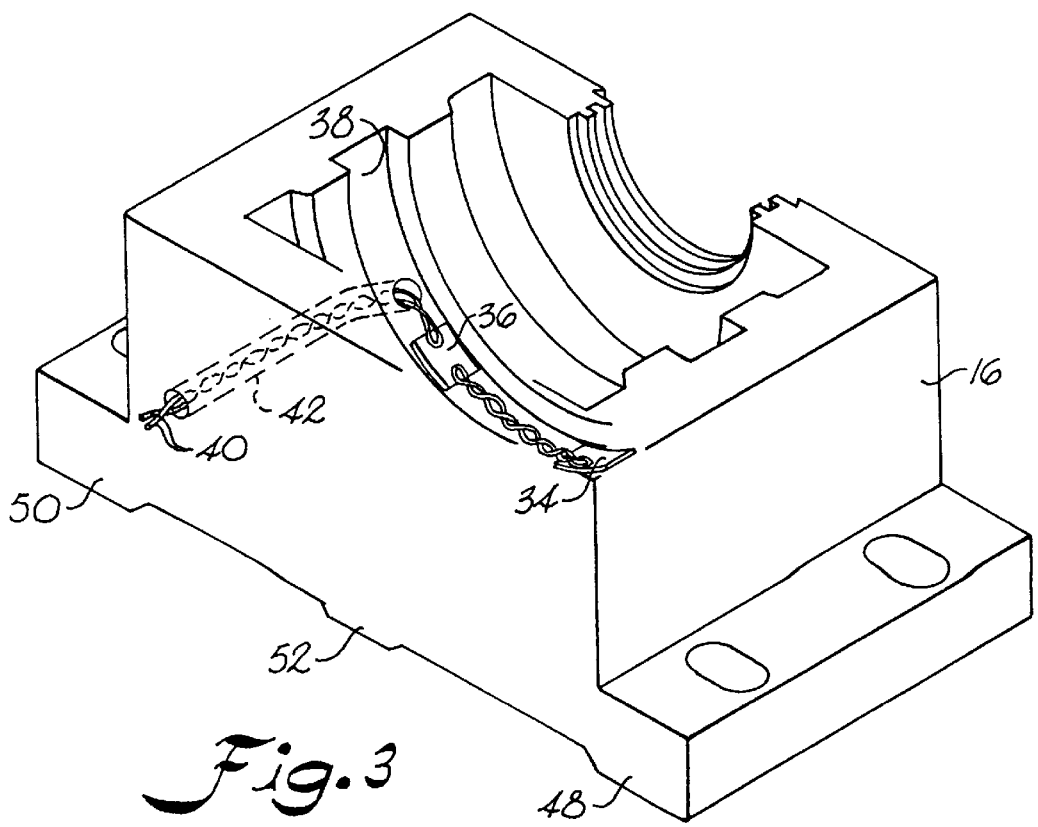
FIG. 3 is a perspective view of a bottom portion of a bearing housing including a pair of load sensors in accordance to the present invention.

Referring now to FIGS. 3 and 4, the illustrated construction utilizes a pair of strain gauges 34 and 36 located in an arcuate recess 38 defined in base portion 16 of the bearing housing. As shown, recess 38 is located in the seat portion on which bearing insert 20 sits, and is thus radially external of outer ring 24. Recess 38 facilitates manufacture of bearing apparatus 10 by placing strain gauges 34 and 36 in a noninterfering location.

Wires 40 provide electrical communication between external circuitry and strain gauges 34 and 36. Preferably, base portion 14 defines a suitable bore 42 through which wires 40 will extend. In the illustrated embodiment, bore 42 is L-shaped, having a shorter radial portion intersecting a longer axial portion.

FIG. 4 diagrammatically represents the spacial relationship between strain gauges 34 and 36. It can be seen that the two strain gauges (represented by the abbreviations "SG1" and "SG2") are angularly spaced by a predetermined angle $\theta$. The angle $\theta$ is bisected by the force F of the shaft load. Strain gauges 34 and 36 are situated in this location to be at a region where easily measurable deformation will occur.

Figure 2:
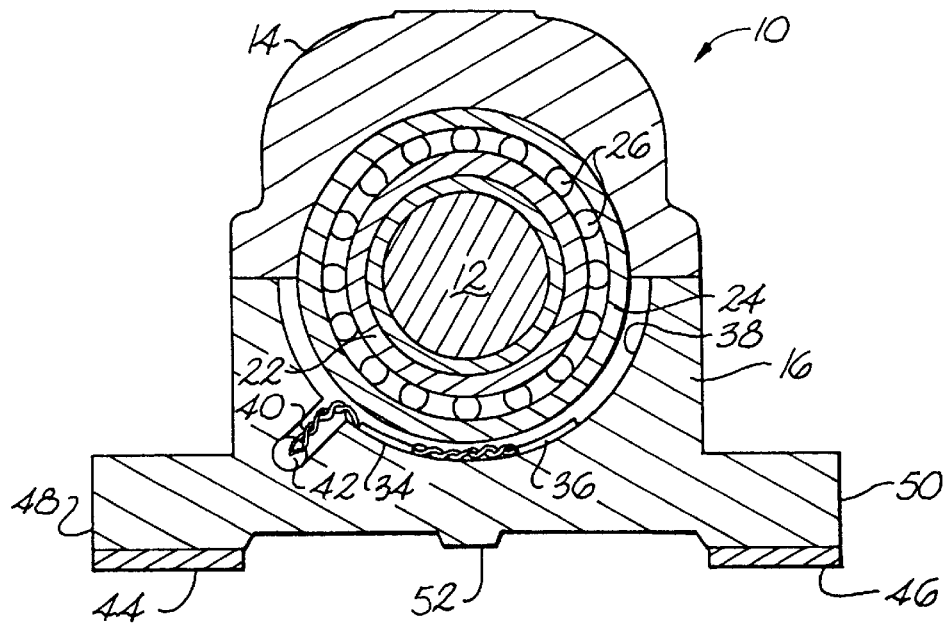
FIG. 2 is a cross sectional view as taken along line 2—2 of FIG. 1.

As shown in FIG. 2, shims 44 and 46 may be placed under respective outer pads 48 and 50 of base portion 14 to lift pad 52, and further enhancing housing deformation. It should be emphasized that the housing structure is preferably preloaded at the time of manufacture in accordance with industry practice. Thus, the deformation that occurs under loading resembles that of a solid ring.

Figure 5:
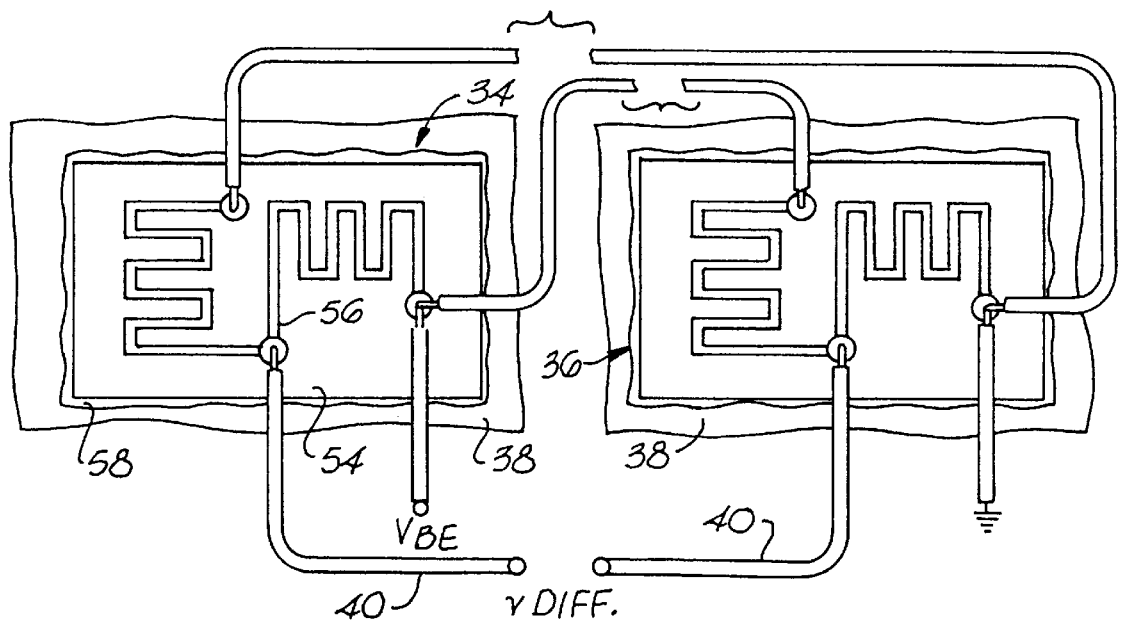
FIG. 5 is an enlarged plan view of a pair of rosette strain gauges as fixed to the bearing housing and connected in a Wheatstone bridge arrangement.

Strain gauges 34 and 36 are shown in greater detail in FIG. 5. Referring particularly to strain gauge 34, a suitable substrate 54 is provided having a resistive trace 56 deposited thereon. Substrate 54 is attached to recess 38 utilizing a suitable epoxy material indicated at 58. It will be appreciated that strain gauge 36 is similarly constructed.

As is well known, the resistance of trace 56 will vary as it is stretched. Thus, deformation of the bearing housing in the region where the strain gauge is affixed will cause a concomitant variation in the measured resistance. The magnitude of this resistance variation is indicative of the degree of deformation, and hence the load.

In this case, each of strain gauges 34 and 36 is a rosette strain gauge that can measure strain in two perpendicular directions. A suitable strain gauge that can be used for this purpose is Model No. CEA-0650UT-350, available from Vishay Measurements Group of Raleigh, N.C. In this case, the resistive trace of each strain gauge comprises a left trace portion and a right trace portion respectively crossing back and forth along a first axis parallel to the axis of the shaft and a second axis transverse thereto. As can be seen, strain gauges 34 and 36 are interconnected in a Wheatstone bridge arrangement in which each of the four trace portions is located in one of the four bridge legs.

The left trace portion of each strain gauge measures strain in the longitudinal direction of recess 38. This is the direction of housing deformation due to bearing load. The rosette structure is desirable to cancel common temperature effects.

Referring again to FIG. 1, bearing apparatus 10 preferably includes various circuitry utilized to detect and condition the resistance variation of strain gauges 34 and 36. In the illustrated embodiment, such circuitry is advantageously attached directly to the exterior of the bearing housing. Specifically, a circuit housing 60 containing such circuitry is attached to the bearing housing by any suitable means, such as bolts 62. The circuitry itself may be mounted on one or more circuit boards 64, which can be "potted" in circuit housing 60 utilizing a suitable potting compound, such as an epoxy.

Figure 6:
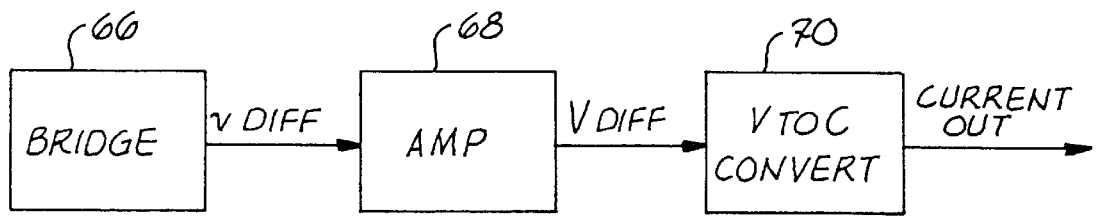
FIG. 6 is a block diagram of electrical circuitry which may be utilized in a bearing apparatus of the present invention.

The various circuitry of bearing apparatus 10 will now be explained with reference to the remaining drawings. As shown in FIG. 6, the circuitry preferably includes a Wheatstone bridge arrangement, indicated at 66, used to produce a small magnitude signal $V_{DIFF}$ proportional to the shaft load. The signal $V_{DIFF}$ is then passed to an amplifier section, indicated at 68, to produce a larger magnitude voltage signal $V_{DIFF}$. The signal $V_{DIFF}$ is converted to a current output signal utilizing voltage-to-current conversion circuitry, indicated at 70. The current output allows the signal to be transmitted over relatively long distances without significant degradation in magnitude as could occur with a voltage signal.

Figure 7A:
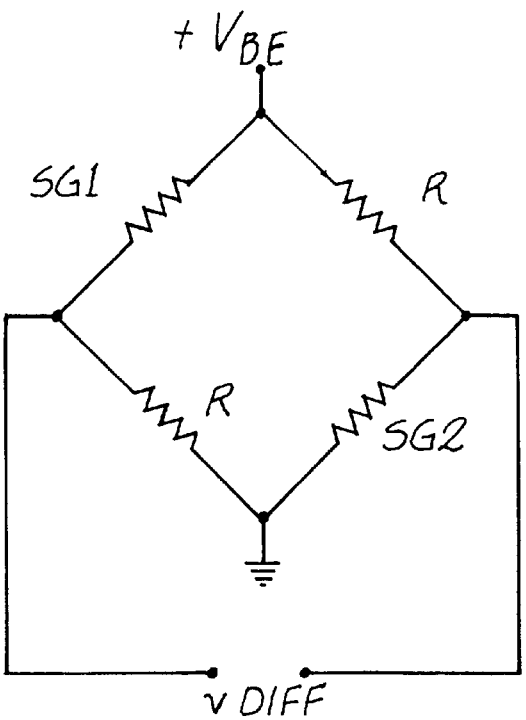
FIGS. 7A and 7B are schematic diagrams of alternative bridge arrangements that can be utilized in a bearing apparatus of the present invention.

FIG. 7A illustrates one bridge arrangement that can be employed in bearing apparatus 10 when rosette strain gauges are not employed. As shown, strain gauges SG1 and SG2 that measure strain only in the horizontal direction are located in opposite legs of the bridge circuit. One node of the bridge is connected to the excitation voltage $V_{BE}$. As shown, another node of the bridge is to ground, or to another potential level, such as a negative potential, that provides a suitable voltage across the bridge.

Figure 7B:
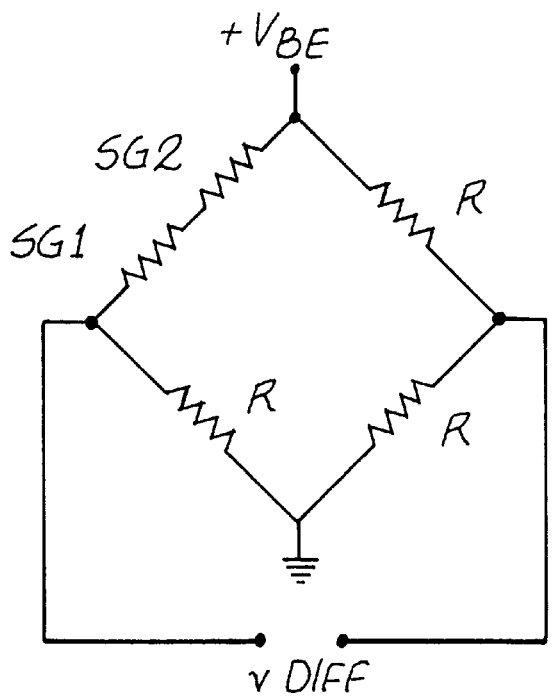
Figure 6:
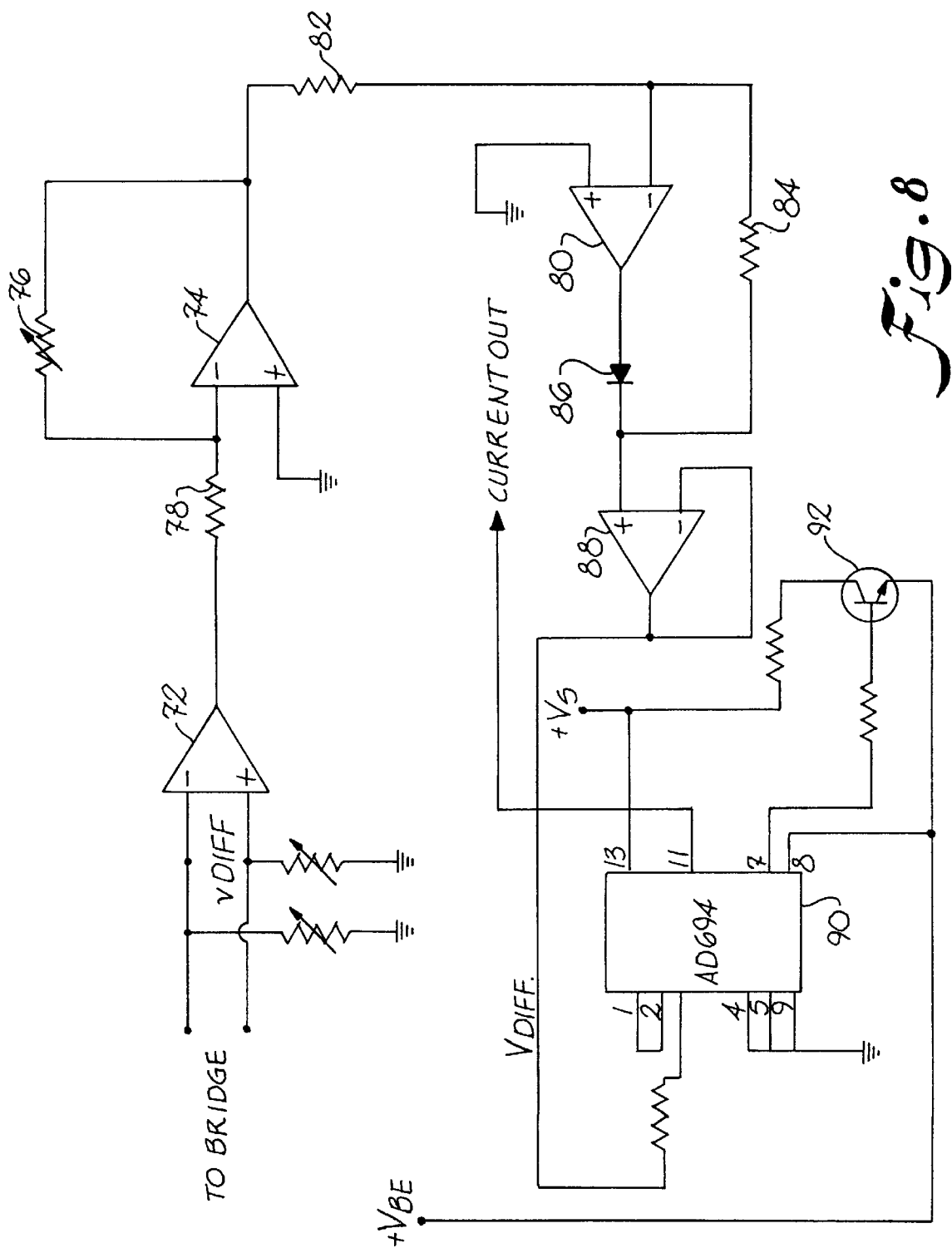

The voltage $V_{DIFF}$ is measured across the remaining two nodes. The other two legs of the bridge circuit include resistors, which may be mounted on circuit board 64. In the circuit of FIG. 7B, strain gauges SG1 and SG2 are serially connected in a single leg of the bridge.

The bridge circuit of FIG. 7A is desirable in some embodiments due to the balancing nature of strain gauges SG1 and SG2 in this arrangement. As a result, common temperature effects on the two strain gauges can be substantially canceled. In other embodiments, the bridge circuit of FIG. 7B is preferred to yield a large signal as the bearing housing is deformed.

One preferred arrangement for the remaining circuitry of bearing apparatus 10 is illustrated in FIG. 8. As shown, the signal $V_{DIFF}$ is applied across the inputs of an open-loop operational amplifier ("op-amp") 72. The output of op-amp 72 is supplied to the negative input of a closed loop op-amp 74. As one skilled in the art will recognized, the gain of op-amp 74 is determined by the values of resistors 76 and 78. Resistor 76 may be a variable resistor as shown.

The output of op-amp 74 is then supplied to the negative input of another op-amp 80. In a manner similar to op-amp 74, the gain of op-amp 80 determined by the values of resistors 82 and 84. As can be seen, however, op-amp 80 further has a diode 86 at its output for the purpose of getting a positive signal. The output of op-amp 80 is then supplied to the input of a voltage follower 88.

The voltage-to-current conversion is accomplished in this case using a known AD694 integrated circuit 90 having the indicated pin assignments. As shown, IC 90 also provides the bridge excitation voltage $V_{BE}$ by controlling a transistor 92 connected to the power supply voltage $V_s$. As such, IC 90 and transistor 92 serve as power circuitry for the detection function. Typically, separate power regulation circuitry will also be located within circuit housing 60 to provide the various supply voltages utilized by the illustrated components.

It can be seen that the present invention provides a novel bearing apparatus having integrated load sensing arrangements. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A bearing apparatus for supporting a rotatable shaft, said bearing apparatus comprising:

a bearing housing having a top portion and a base portion;

a bearing set disposed within said housing; and a plurality of load sensors located within said base portion of said bearing housing radially separated from said shaft and spaced apart by a predetermined angular separation about a centerline axis of said shaft at substantially the same radius, said load sensors providing an electrical indication of loading on said rotatable shaft based on tangential deformation of said bearing housing.

2. A bearing apparatus as set forth in claim 1, wherein said bearing housing defines an arcuate recess radially spaced from said shaft, said load sensors being fixed in said recess.

3. A bearing apparatus as set forth in claim 2, wherein said plurality of load sensors comprises a pair of strain gauges.

4. A bearing apparatus as set forth in claim 1, wherein said bearing set comprises a bearing insert having opposed inner and outer rings, a plurality of bearing elements being disposed in a region between said inner and outer rings.

* * * * *